United States Patent [19]

Filby

[11] 3,993,732

[45] Nov. 23, 1976

[54] METHOD OF RECYCLING LITHIUM BORATE TO LITHIUM BOROHYDRIDE THROUGH DIBORANE

[75] Inventor: Evan E. Filby, Rigby, Idaho

[73] Assignee: The United States of America as represented by the United States Energy Research and Development Administration, Washington, D.C.

[22] Filed: July 16, 1975

[21] Appl. No.: 596,549

[52] U.S. Cl. .............................. 423/286; 423/288; 423/657
[51] Int. Cl.$^2$ ...................... C01B 1/03; C01B 6/21
[58] Field of Search ...................... 423/286–288, 423/648, 657, 283–284; 252/182

[56] References Cited
UNITED STATES PATENTS

| | | | |
|---|---|---|---|
| 2,974,015 | 3/1961 | Peterson | 423/287 |
| 3,405,068 | 10/1968 | Hiltz | 423/657 X |
| 3,473,899 | 10/1969 | Cooper | 423/287 |

OTHER PUBLICATIONS

Adams; *Boron Metallo–Boron Compounds and Boranes;* Interscience Publishers; N.Y., 1964; pp. 382–384.

*Primary Examiner*—G. O. Peters
*Attorney, Agent, or Firm*—Dean E. Carlson; Arthur A. Churm; Robert J. Fisher

[57] ABSTRACT

This invention provides a method for the recycling of lithium borate to lithium borohydride which can be reacted with water to generate hydrogen for utilization as a fuel. The lithium borate by-product of the hydrogen generation reaction is reacted with hydrogen chloride and water to produce boric acid and lithium chloride. The boric acid and lithium chloride are converted to lithium borohydride through a diborane intermediate to complete the recycle scheme.

10 Claims, 1 Drawing Figure

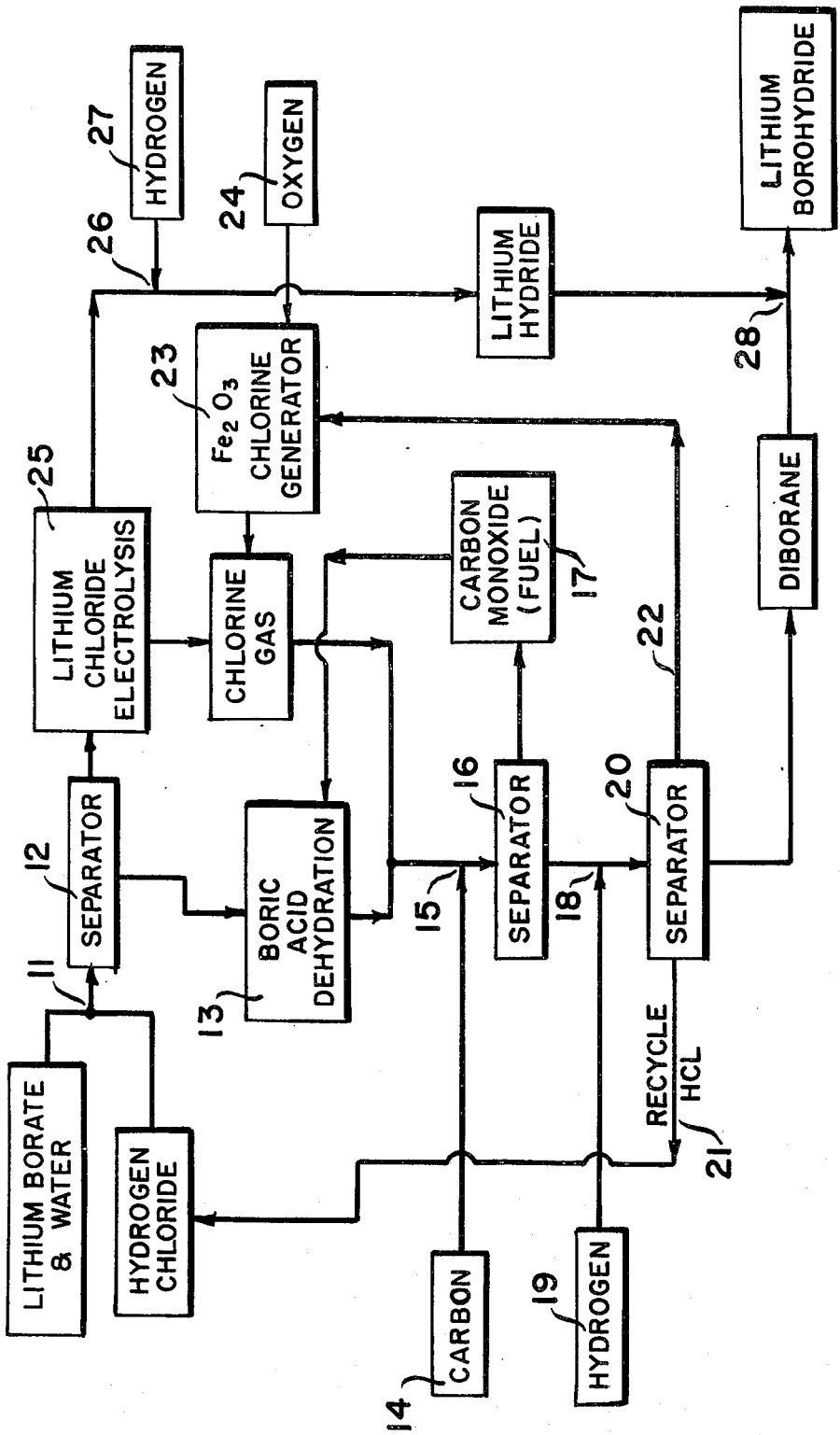

METHOD OF RECYCLING LITHIUM BORATE TO LITHIUM BOROHYDRIDE THROUGH DIBORANE

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates generally to the use of hydrogen gas as a fuel and is concerned with a secondary source which enables the storage and subsequent controlled liberation of hydrogen gas for use as a fuel. The invention concerns such a secondary source which is also readily adaptable to use in mobile systems.

More particularly, this invention concerns the use of lithium borohydride as such a source of hydrogen and specifically is directed toward a method of recycling the lithium borate by-product of the hydrogen generation reaction back to the lithium borohydride starting material.

As the energy squeeze continues, and at times reaches crisis proportions, increasing interest and concern is directed toward the development of new sources of energy. A most important concern is the continuing and ever increasing consumption of our limited fossil fuels with the consumption of petroleum-derived fuels being an acute concern. As the consumption of petroleum continues and in fact increases, reducing the world's limited known reserves, efforts are directed toward the development of alternative energy sources to alleviate the pressing demand for more energy. A particular concern is the enormous amount of petroleum being burned as motor vehicle fuel and as fuel at central electric power-generating stations. An alternative fuel for these applications is especially desired in view of the enormous amount of fuel so consumed and in view of the fact that petroleum can more valuably be put to use in other products, i.e. plastics, lubricants, synthetics, etc.

One possible and highly potential alternative fuel which has been proposed and widely considered is hydrogen. In fact, proponents of the development of hydrogen as an alternative fuel have gone so far as to suggest the possibilities of a "hydrogen economy", that is, that the development of hydrogen as an alternative fuel will lead to and result in the use of hydrogen gas as a major if not the major fuel of the future. As a fuel, hydrogen gas does have potential and does offer several significant advantages, not the least of which is that it is a non-polluting fuel since its only combustion product is water vapor. This is a most important consideration in view of the equally important concern for protecting the environment.

The use of hydrogen gas as a fuel does not present any significant hurdles as many kinds of motors have been converted to run on gas and hydrogen fuel cells are widely known. Such use of hydrogen gas as a fuel is possible employing either hydrogen gas by itself or as a diluent in conjunction with natural gas. It has been proposed that hydrogen gas can be burned or used in fuel cells at individual locations, being pumped to the separate individual locations much as natural gas is today. Alternatively, hydrogen gas can be produced and stored during periods of low power demands for subsequent burning at central power plants to produce electricity during peak power demands. Hydrogen can also be used as a motor vehicle fuel, in much the same manner as propane or butane is used at present. Various types of vehicle motors can be converted to run on the gas with common sources of the hydrogen gas being a supply of cryogenic liquid hydrogen or gas bottled under pressure.

However, since the use of pressurized bottled hydrogen or liquid hydrogen does present a number of difficult storage and handling problems, alternative materials as possible secondary sources of hydrogen gas have been extensively investigated. The difficulty with many of the alternatives and secondary sources proposed is the considerable weight penalties which are incurred with the proposed materials. This difficulty is a severe disadvantage in portable hydrogen source applications such as in motor vehicles.

The present invention was devised in response to a problem confronting a co-worker, James L. Lofthouse, who devised a method for the production of hydrogen for utilization as a fuel by storing the hydrogen in solid form as a light alkali metal borohydride and subsequently liberating the hydrogen as a gas by reacting with water. This method is the subject of a co-pending patent application Ser. No. 596,554 filed July 16, 1975. It was found that because of its extremely favorable material weight to hydrogen-production ratio lithium borohydride was a particularly favorable and advantageous secondary source of hydrogen, especially proving advantageous for use in mobile fuel systems. The lithium borohydride can be reacted with water to produce hydrogen, leaving lithium borate as a by-product. A further discussion of this method and its advantages as well as a detailed discussion of the present invention is contained in the report "Possibilities for Lithium Borohydride Recycle" by the present applicant, Evan E. Filby, Allied Chemical Corporation - Idaho Chemical Programs Report ICP-1054, which report is incorporated herein by reference. This report was abstracted in the Nov. 30, 1974 issue of *Nuclear Science Abstracts*, Vol. 30, Abstract No. 28830 and is available from the National Technical Information Service, U.S. Department of Commerce, Springfield, Virginia 22151.

Since the lithium borate by-product contains the valuable materials lithium and boron and it is highly desirable to avoid the waste of these materials, it is an object of the present invention to provide a method for the recycling of these materials from the lithium borate Since it is also preferable that the boron and lithium be recycled to reconstitute the borohydride, it is also an object of the present invention to provide a method of recycling lithium borate to lithium borohydride.

It is another object of the present invention to provide a recycle scheme in which the reaction steps involved are industrially attractive.

Another object of the present invention is to provide a recycle scheme in which an acceptable energy balance exists.

Other objects and advantages of the present invention will become apparent upon reading the following description of the invention.

SUMMARY OF THE INVENTION

In accordance with the present invention, lithium borate is recycled to lithium borohydride by reacting the lithium borate with hydrogen chloride and water to produce boric acid and lithium chloride. The lithium chloride and boric acid so produced are converted to lithium borohydride through a diborane intermediate.

BRIEF DESCRIPTION OF THE DRAWING

Other aspects and features of the present invention will become apparent upon reading the following detailed description of the invention together with reference to the drawing which is a flow diagram of the essential features of a preferred embodiment of the recycle scheme for lithium borate in accordance with the present invention.

DETAILED DESCRIPTION OF THE INVENTION

While the present invention is equally applicable to the recycle to lithium borohydride of lithium borate from other sources, the present method is particularly concerned with recycling lithium borate which is formed as a by-product of the reaction between lithium borohydride and water to produce hydrogen. The lithium borate by-product of this reaction may be a damp solid, a thick slurry, or a solution. Whatever the form of the lithium borate or its origin, the initial step in the recycle scheme is the treatment of the lithium borate material itself with hydrogen chloride and water to produce boric acid and lithium chloride.

$$LiBO_2 + HCl + H_2O = LiCl + H_3BO_3$$

Following the initial reaction, the lithium chloride and boric acid products are separated. While various separation techniques could be employed, separation of the two products on the basis of solubility should be an easy and straightforward procedure since lithium chloride is significantly more soluble in water than boric acid. The solubilities of these materials are 27.6 g/100 g $H_2O$ at 100° C and 2.42 g/100 g $H_2O$ at 0° C for boric acid as compared to 130 g/100 g $H_2O$ at 95° C and 63.7 g/100 g $H_2O$ at 0° C for lithium chloride. An additional advantageous feature of separation based upon solubilities is that boric acid is even less soluble in water when lithium chloride is also present in the solution.

Following the initial reaction and separation step, the boric acid and lithium chloride are converted to lithium borohydride through a diborane intermediate. Diborane, $B_2H_6$, is produced from the boric acid obtained in the initial reaction, the production of the diborane being possible through various reaction sequences. The first step in some of the various possible reaction sequences is the conversion of the boric acid to boric oxide, this acid dehydration being readily accomplished by strongly heating the acid.

$$2 H_3BO_3 \xrightarrow{heat} B_2O_3 + 3 H_2O$$

A variation of this procedure can be used as it obtains a particularly reactive form of the oxide. This variation involves the vacuum drying of powdered boric acid at 1 to 2 torr pressure and 260°–270° C temperature for about six hours.

Following the acid dehydration, the next step is the preparation of boron trichloride from the boric oxide. The preferred method is a direct chlorination:

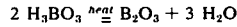
$$B_2O_3 + 3 C + 3 Cl_2 \xrightarrow{500°} 2 BCl_3 + 3 CO$$

While the carbon monoxide by-product prevents the establishment of a truly closed cycle, it can be used as a fuel gas and burned to produce heat such as for the acid dehydration step above. The reaction is therefore advantageous in that respect and there are no unused or wasted by-products.

Several potential reactions could be used to convert the boron trichloride to diborane including the two related routes involving the reaction of boron trichloride with lithium aluminum hydride or with lithium hydride.

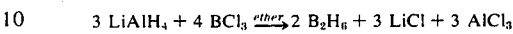
$$3 LiAlH_4 + 4 BCl_3 \xrightarrow{ether} 2 B_2H_6 + 3 LiCl + 3 AlCl_3$$

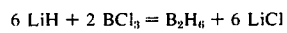
$$6 LiH + 2 BCl_3 = B_2H_6 + 6 LiCl$$

These two and other similar preparations of diborane are less efficient than the highly preferred route which is a more direct synthesis of diborane by the reaction of boron trichloride and hydrogen in the presence of an electric arc.

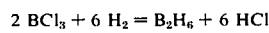
$$2 BCl_3 + 6 H_2 = B_2H_6 + 6 HCl$$

While the process requires several passes to obtain a high yield since the reaction generally produces a mixture of diborane and unreacted boron trichloride, repetition does allow the obtaining of an overall yield of as high as 80%. This direct synthesis is also preferred since the only by-product is hydrogen chloride which can readily be cycled for use elsewhere in the overall recycle scheme.

The diborane intermediate can then be reacted with a lithium species to produce lithium borohydride through a variety of reactions. For example, diborane undergoes a long known reaction with the compound ethyl lithium to produce lithium borohydride.

$$2 LiC_2H_5 + 2 B_2H_6 = 2 LiBH_4 + (C_2H_5)_2B_2H_4$$

However, for the purposes of a cyclic recycle scheme, this reaction has the severe handicaps that the yield is low and a large percentage of the boron ends up as a new by-product. A more favorable reaction occurs with lithium ethoxide.

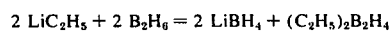
$$3 LiOC_2H_5 + 2 B_2H_6 = 3 LiBH_4 + B(OC_2H_5)_3$$

The lithium ethoxide could be prepared by reaction of lithium metal with ethanol.

$$C_2H_5OH + Li = LiOC_2H_5 + ½ H_2$$

A more preferable and more favorable route would be to react the lithium metal with hydrogen to form lithium hydride and react the resulting lithium hydride with ethanol to yield the lithium ethoxide since the formation of lithium hydride is an exothermic process and the lithium hydride reacts more readily with methanol than does the metal.

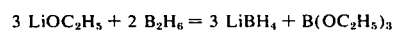
$$Li + ½ H_2 = LiH$$

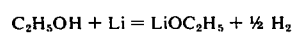
$$LiH + C_2H_5OH = LiOC_2H_5 + H_2 (g)$$

However, another alternative reaction is preferred. This is the direct reaction of diborane with lithium hydride.

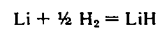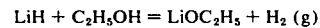
$$2 LiH + B_2H_6 \xrightarrow[solvent]{ether} 2 LiBH_4$$

This latter reaction eliminates some of the steps needed in the lithium ethoxide reaction sequence which includes the formation and reaction of lithium hydride and this latter reaction is more favorable since it proceeds with a very high yield to the desired lithium borohydride product with no by-products which must in turn be cycled, whereas a portion of the boron ends up as a by-product in the lithium ethoxide reaction.

The lithium hydride is obtained from the lithium chloride produced in the initial reaction between lithium borate, water and hydrogen chloride. The separated lithium chloride is electrolyzed, most easily from the molten salt, to produce chlorine and lithium, the lithium subsequently being reacted directly with hydrogen to yield the lithium hydride.

$$2\ LiCl = 2\ Li + Cl_2\ (g)$$

$$H_2 + 2\ Li = 2\ LiH$$

The above set of preferred reactions are also attractive and advantageous in that the by-products are all cyclable back into the overall recycle scheme. The use of the carbon monoxide by-product of the boric oxide to boron trichloride reaction as a fuel to assist in the generation of heat for the acid dehydration reaction was previously mentioned. The hydrogen chloride generated in the conversion of boron trichloride to diborane can also be cycled such as for the initial reaction with lithium borate. However, since an excess of hydrogen chloride is produced over that required for reaction with lithium borate and a source of chlorine gas is required for reaction with boric oxide, it is preferred that a portion of the hydrogen chloride be converted to chlorine. Hydrogen chloride can be converted to chlorine by a known industrial process using iron oxide as a converter bed:

$$6\ HCl + Fe_2O_3 = 2\ FeCl_3 + 3\ H_2O$$

$$2\ FeCl_3 + 3/2\ O_2 = Fe_2O_3 + 3\ Cl_2$$

which gives a net reaction of:

$$6\ HCl + 3/2\ O_2 = 3\ Cl_2 + 3\ H_2O$$

A portion of the required chlorine is also obtained from the electrolysis of the lithium chloride.

The preferred overall recycle scheme can perhaps be more clearly visualized referring to the drawing where there is illustrated a flow diagram of the essential features of a preferred embodiment of the method of recycling lithium borate to lithium borohydride through a diborane intermediate in accordance with the present invention. The initial reaction between the lithium borate, water and hydrogen chloride at point 11 produces lithium chloride and boric acid which are separated as is represented by separator 12. The boric acid product is converted to boric oxide by a boric acid dehydration step 13. An external source of carbon 14 is necessary for the conversion of the boric oxide to boron trichloride by reaction with carbon and chlorine at point 15. The carbon monoxide by-product of the reaction at point 15 is separated as by separator 16 and is cycled back into the recycle scheme to be employed as carbon monoxide fuel 17 to provide heat for the boric acid dehydration step 13. The separated boron trichloride product is reacted at point 18 with externally introduced hydrogen 19 to produce the diborane intermediate. The hydrogen chloride by-product of the reaction at point 18 is separated as represented by separator 20 and is cycled back into the overall recycle scheme either along line 21 to react with the lithium borate and water at point 11 or along line 22 to serve as a source of chlorine. The hydrogen chloride cycled along line 22 is reacted in a ferric oxide chlorine generator 23 with oxygen introduced from external oxygen source 24 in contact with an iron oxide converter bed to produce chlorine gas which is employed in the conversion of the boric oxide to boron trichloride at point 15. Chlorine for use in the conversion step at point 15 is also obtained as a by-product from the electrolysis, represented at 25, of the lithium chloride product of the initial reaction at point 11 which is separated by separator 12. The lithium produced by the electrolysis 25 is reacted at point 26 with hydrogen from an external source 27 to yield lithium hydride. The diborane produced by the reaction at point 18 and separated from the by-product as represented by separator 20 is reacted at point 28 with the lithium hydride produced at point 26 to produce the desired lithium borohydride end-product.

This overall recycle scheme is favorable in that it is a reasonably cyclic scheme consuming only carbon and oxygen and producing carbon dioxide and water, in addition to the necessary consumption of hydrogen and energy. The cyclic nature of the overall scheme can be more fully appreciated by listing and summing the various reactions involved:

| | | |
|---|---|---|
| 2 LiBO$_2$ | + 2 H$_2$O + 2 HCl = 2 LiCl + 2 H$_3$BO$_3$ | |
| | 2 H$_3$BO$_3$ $\xrightarrow{heat}$ B$_2$O$_3$ | + 3 H$_2$O |
| 3 C | + B$_2$O$_3$ + 3 Cl$_2$ = 2 BCl$_3$ + 3 CO | |
| 3/2 O$_2$ | + 3 CO = | 3 CO$_2$ |
| 6 H$_2$ | + 2 BCl$_3$ + B$_2$H$_6$ + 6 HCl | |
| | 2 LiCl = 2 Li + Cl$_2$ | |
| H$_2$ | + 2 Li = 2 LiH | |
| O$_2$ | + 4 HCl = 2 Cl$_2$ + 2 H$_2$O | |
| | 2 LiH + B$_2$H$_6$ = | 2 LiBH$_4$ | which gives a net reaction of:

$$2\ LiBO_2 + 3\ C + 7\ H_2 + 5/2\ O_2 = 2\ LiBH_4 + 3\ H_2O + 3\ CO_2$$

As is readily seen from the net reaction, the present method for the recycle of lithium borate to lithium borohydride is a very reasonable cycle involving only the input of hydrogen, carbon and oxygen and generating only water and carbon dioxide as waste products, and of course requiring the necessary input of energy. The recycle sequence through diborane in accordance with the present invention has an extremely favorable energy balance. The amount of energy required to carry out this recycle scheme has been investigated and it has been found that the scheme poses an industrially feasible method for recycling lithium borate to lithium borohydride. The overall energy penalty for the cycle is more fully discussed in the above-cited report ICP-1054. The present method of recycle also offers the advantages that many of the individual reactions are known and employed on an industrial or semi-commercial scale in relation to other processes. In addition, the chemical separations required during the process are not difficult.

The embodiments of the invention in which an exclusive property or privilege is claimed are defined as follows:

1. A process for recovery of lithium borohydride from lithium borate formed as a by-product in the generation of hydrogen by reaction of lithium borohydride with water which comprises:
  a. reacting said lithium borate with hydrogen chloride and water to form boric acid and lithium chloride
  b. converting said boric acid to boron trichloride
  c. converting said boron trichloride to diborane
  d. converting the lithium chloride of step a) to a lithium species selected from the group of ethyl lithium, lithium ethoxide, and lithium hydride
  e. reacting said lithium species with said diborane to form lithium borohydride.

2. The method of claim 1 wherein said lithium chloride is converted to lithium hydride and said lithium hydride is reacted with diborane to produce lithium borohydride.

3. The method of claim 1 wherein the boric acid is converted to boron trichloride and the boron trichloride is reacted with hydrogen to produce the diborane.

4. The method of claim 3 wherein said boric acid is converted to boron trichloride by dehydrating said boric acid to boric oxide and said boric oxide is reacted with carbon and chlorine so as to produce said boron trichloride.

5. The method of claim 4 further comprising cycling the carbon monoxide by-product of the reaction between the boric oxide, carbon and chlorine back into the recycle scheme as a fuel gas to provide heat for the dehydrating of said boric acid.

6. The method of claim 4 further comprising cycling a portion of the hydrogen chloride by-product of the reaction between boron trichloride and hydrogen back into the recycle scheme for the reaction with lithium borate and water to produce boric acid and lithium chloride.

7. The method of claim 4 further comprising cycling a portion of the hydrogen chloride by-product of the reaction between boron trichloride and hydrogen back into the recycle scheme to serve as a source of chlorine for the reaction with boric oxide and carbon to produce boron trichloride.

8. The method of claim 7 wherein said chlorine is obtained from said hydrogen chloride source of chlorine by reacting said hydrogen chloride with oxygen in contact with a ferric oxide converter bed.

9. The method of claim 4 wherein lithium chloride is converted to lithium hydride by decomposing said lithium chloride to chlorine and lithium, said lithium is reacted with hydrogen to produce said lithium hydride, and said lithium hydride is reacted with said diborane to produce lithium borohydride.

10. The method of claim 9 further comprising cycling said chlorine by-product from the decomposition of said lithium chloride back into the recycle scheme for reaction with carbon and boric oxide to produce boron trichloride.

* * * * *